United States Patent
Yu

(10) Patent No.: US 12,280,619 B2
(45) Date of Patent: *Apr. 22, 2025

(54) WIRELESS TIRE PRESSURE MONITORING SYSTEM AND METHOD FOR ALLOCATING POSITION OF WIRELESS TIRE PRESSURE SENSOR

(71) Applicant: Chih-Wei Yu, Taipei (TW)

(72) Inventor: Chih-Wei Yu, Taipei (TW)

(73) Assignee: SYSGRATION LTD.

(*) Notice: Subject to any disclaimer, the term of this patent is extended or adjusted under 35 U.S.C. 154(b) by 0 days.

This patent is subject to a terminal disclaimer.

(21) Appl. No.: 18/096,017

(22) Filed: Jan. 12, 2023

(65) Prior Publication Data
US 2023/0234405 A1    Jul. 27, 2023

(30) Foreign Application Priority Data

Jan. 27, 2022   (TW) .................................. 111103660

(51) Int. Cl.
B60C 23/04 (2006.01)
G01L 17/00 (2006.01)

(52) U.S. Cl.
CPC ...... *B60C 23/0433* (2013.01); *B60C 23/0416* (2013.01); *G01L 17/005* (2013.01)

(58) Field of Classification Search
CPC . B60C 23/0416; B60C 23/0489; B60C 23/04; B60C 23/0447; B60C 23/0438; B60C 2019/004; G01L 17/00
See application file for complete search history.

(56) References Cited

U.S. PATENT DOCUMENTS

| | | | | |
|---|---|---|---|---|
| 2010/0097203 | A1* | 4/2010 | Chen ................... | B60C 23/0444 340/447 |
| 2014/0292505 | A1* | 10/2014 | McIntyre .............. | B60C 23/044 340/442 |
| 2015/0174971 | A1* | 6/2015 | Kim ..................... | B60C 23/0489 340/447 |
| 2020/0065433 | A1* | 2/2020 | Duff ......................... | G01S 5/02 |
| 2022/0324272 | A1* | 10/2022 | Fu ....................... | B60C 23/0444 |

* cited by examiner

*Primary Examiner* — Mirza F Alam

(57) ABSTRACT

A wireless tire pressure monitoring system and a method for operating the tire pressure monitoring system to locate each wireless tire pressure sensor. The wireless host is connected to the wireless receiver. Each wireless tire pressure sensor sends info to the wireless host and the wireless receiver. The wireless host and the wireless receiver allocate the positions of the wheels where the wireless tire pressure sensors are installed by the info received from wireless tire pressure sensors. The wireless receiver analyses and calculates the received info, and forwards the result to the wireless host to process a cross-comparison to precise allocate the positions of the wireless tire pressure sensors. The method does not need to replace or add new wireless tire pressure sensors, and does not need to obtain new serial numbers. The positions of the wireless tire pressure sensor are precisely allocated by the method of the present invention.

6 Claims, 4 Drawing Sheets

WIRELESS TIRE PRESSURE MONITORING SYSTEM AND METHOD FOR ALLOCATING POSITION OF WIRELESS TIRE PRESSURE SENSOR

BACKGROUND OF THE INVENTION

1. Fields of the Invention

The present invention relates to a wireless tire pressure monitoring system and a method for allocating position of each wireless tire pressure sensor of the wireless tire pressure monitoring system.

2. Descriptions of Related Art

Many motor vehicles are equipped with tire pressure monitoring systems to allow the drivers to obtain the status of car tires in real time to avoid sudden tire blowout or insufficient tire pressure, and to affect driving safety. The tire pressure monitoring system includes a tire pressure sensor installed to the wheel rim of the car, and a host computer installed inside the car. Each tire pressure sensor read the air pressure in the corresponding tire or other predictive parameters within a certain period of time, such as tire temperature, tire humidity, etc., and then send the read results to the host computer. If the result detected by any tire pressure sensor is abnormal, the tire pressure monitoring system will generate an alarm signal to inform the driver, so that the driver is warned so as to avoid accidents.

The conventional tire pressure monitoring systems burn the wheel positions and the serial numbers of the tire pressure sensors to the host computer so that the host computer is able to distinguish which tire needs to be replaced or maintained.

However, the wheel positions and the serial numbers of the tire pressure sensors have to be burned by the manufacturers, and this takes a lot of time and is not convenient for most of the users.

In addition, due to restrictions of the wireless system, the info may be lost or incorrect during transmission. The users have to go back to the manufacturers to burn the correct info again. For some large vehicles such as six-wheel or eight-wheel trucks, the tire pressure sensors may be located too far from the host computer and cannot have the wireless signals. The users cannot obtain the real-time information of some of the tires.

The present invention intends to provide a wireless tire pressure monitoring system, and a method for operating the wireless tire pressure monitoring system to precisely position each tire pressure sensor of different wheels to eliminate the shortcomings mentioned above.

SUMMARY OF THE INVENTION

The present invention relates to a wireless tire pressure monitoring system comprises a wireless tire pressure sensor installed to a wheel rim, and the wireless tire pressure sensor includes a sensing module and an emitting module.

A wireless host is installed to a vehicle, and includes a control module and a first receiving/emitting module. The control module includes a function of allocation by signals received. The first receiving/emitting module receives signals from the wireless tire pressure sensor.

A wireless receiver is connected to the wireless host and the wireless tire pressure sensor by a wireless system. The wireless receiver is located at a position different from a position of the wireless host. The wireless receiver 3 includes an operation module and a second receiving/emitting module. The second receiving/emitting module receives and emits signals.

The wireless tire pressure sensor sends signals to the first receiving/emitting module and the second receiving/emitting module by the emitting module. The first receiving/emitting module and the second receiving/emitting module detect strength of the signals emitted from the wireless tire pressure sensor. The first receiving/emitting module and the second receiving/emitting module send the signals received from the wireless tire pressure sensor to the control module and the operation module to be analyzed. The operation module forwards a result of the analyzed signals to the first receiving/emitting module and the control module by the second receiving/emitting module. The first receiving/emitting module 21 sends the signal to the control module to be cross-compared.

The present invention also provides a method for allocating position of a wireless tire pressure sensor of a wireless tire pressure monitoring system. The method comprises a connection step, a setting step, a transmission step, a calculating and forwarding step, and a completion step. The connection step sets a wireless receiver to be connected to a wireless host by a wireless system. The wireless receiver then searches and connects each wireless tire pressure sensor by a wireless system.

The setting step is that a user operates the wireless receiver to let the wireless receiver acknowledges its position, and to assist allocation of each wireless tire pressure sensor.

The transmission step is that each wireless tire pressure sensor sends a tire pressure info to the wireless host and the wireless receiver.

The calculating and forwarding step is that the wireless host and the wireless receiver receive the tire pressure info from each wireless tire pressure sensor, and analyze and calculate a position of each wireless tire pressure sensor by the tire pressure info that each wireless tire pressure sensor sends. The wireless host and the wireless receiver allocate the position of each wireless tire pressure sensor by one of or more than one of a signal strength and a phase angle of the tire pressure info. The wireless receiver forwards a result of calculation made by the wireless receiver to the wireless host.

The completion step is that the wireless host cross-compares a result of calculation of the position of each wireless tire pressure sensor made the wireless host, and the result of calculation of the position of each wireless tire pressure sensor made by the wireless receiver to allocate each wireless tire pressure sensor.

The primary object of the present invention is to provide a method to allocate positions of each wireless tire pressure sensor. The method is to connect the wireless host to the wireless receiver. Each wireless tire pressure sensor sends info to the wireless host and the wireless receiver. The wireless host and the wireless receiver allocate the positions of the wheels where the wireless tire pressure sensors are installed by one of or more than one of the signal strength and the phase angle of the tire pressure info. The wireless receiver analyses and calculates the received info, and forwards the result to the wireless host to process a cross-comparison to precise allocate the positions of the wireless tire pressure sensors. The method does not need to replace or add new wireless tire pressure sensors, and does not need to obtain new serial numbers. The positions of the wireless tire pressure sensor are precisely allocated by the method of the present invention.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
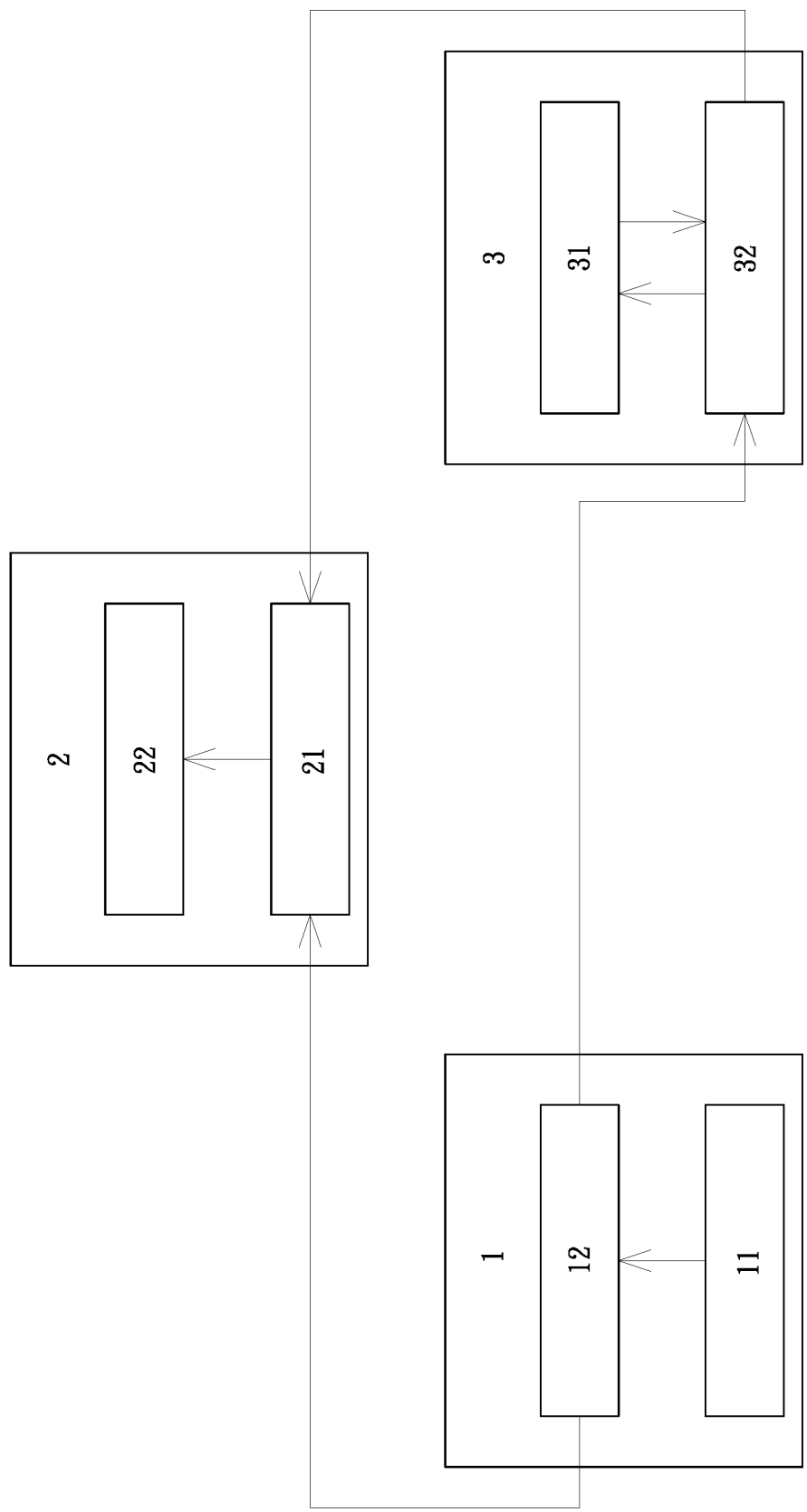
FIG. 1 shows the components of the wireless tire pressure monitoring system of the present invention.

Referring to FIGS. 1 to 4, the wireless tire pressure monitoring system of the present invention comprises a wireless tire pressure sensor 1 installed to a wheel rim, and the wireless tire pressure sensor 1 includes a sensing module 11 and an emitting module 12.

A wireless host 2 is installed to the vehicle, and includes a control module 22 and a first receiving/emitting module 21. The control module 22 includes the function of allocation by signals received. The first receiving/emitting module 21 receives signals from the wireless tire pressure sensor 1.

A wireless receiver 3 is connected to the wireless host 2 and the wireless tire pressure sensor 1 by a wireless system. The wireless receiver 3 is located at a position different from a position of the wireless host 2. The wireless receiver 3 includes an operation module 31 and a second receiving/emitting module 32. The second receiving/emitting module 32 receives and emit signals.

The wireless tire pressure sensor 1 sends signals to the first receiving/emitting module 21 and the second receiving/emitting module 32 by the emitting module 12. The first receiving/emitting module 21 and the second receiving/emitting module 32 detect strength of the signals emitted from the wireless tire pressure sensor 1. The first receiving/emitting module 21 and the second receiving/emitting module 32 send the signals received from the wireless tire pressure sensor 1 to the control module 22 and the operation module 31 to be analyzed. The operation module 31 forwards the result of the analyzed signals to the first receiving/emitting module 21 and the control module 22 in sequence by the second receiving/emitting module 32.

Figure 2:
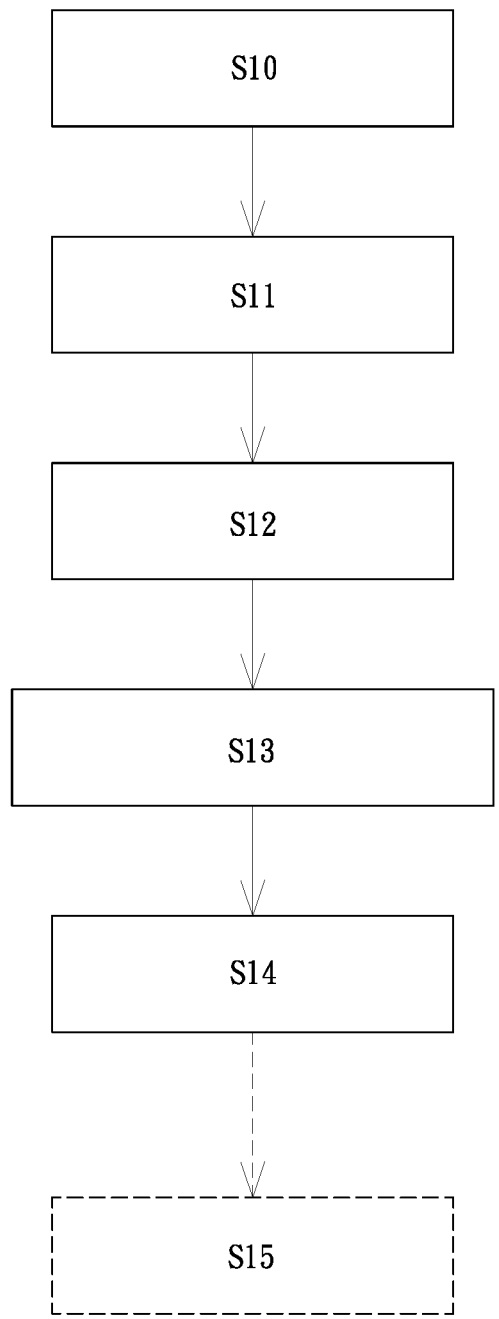
FIG. 2 shows the steps of the method for operating the wireless tire pressure monitoring system of the present invention.
Figure 3:
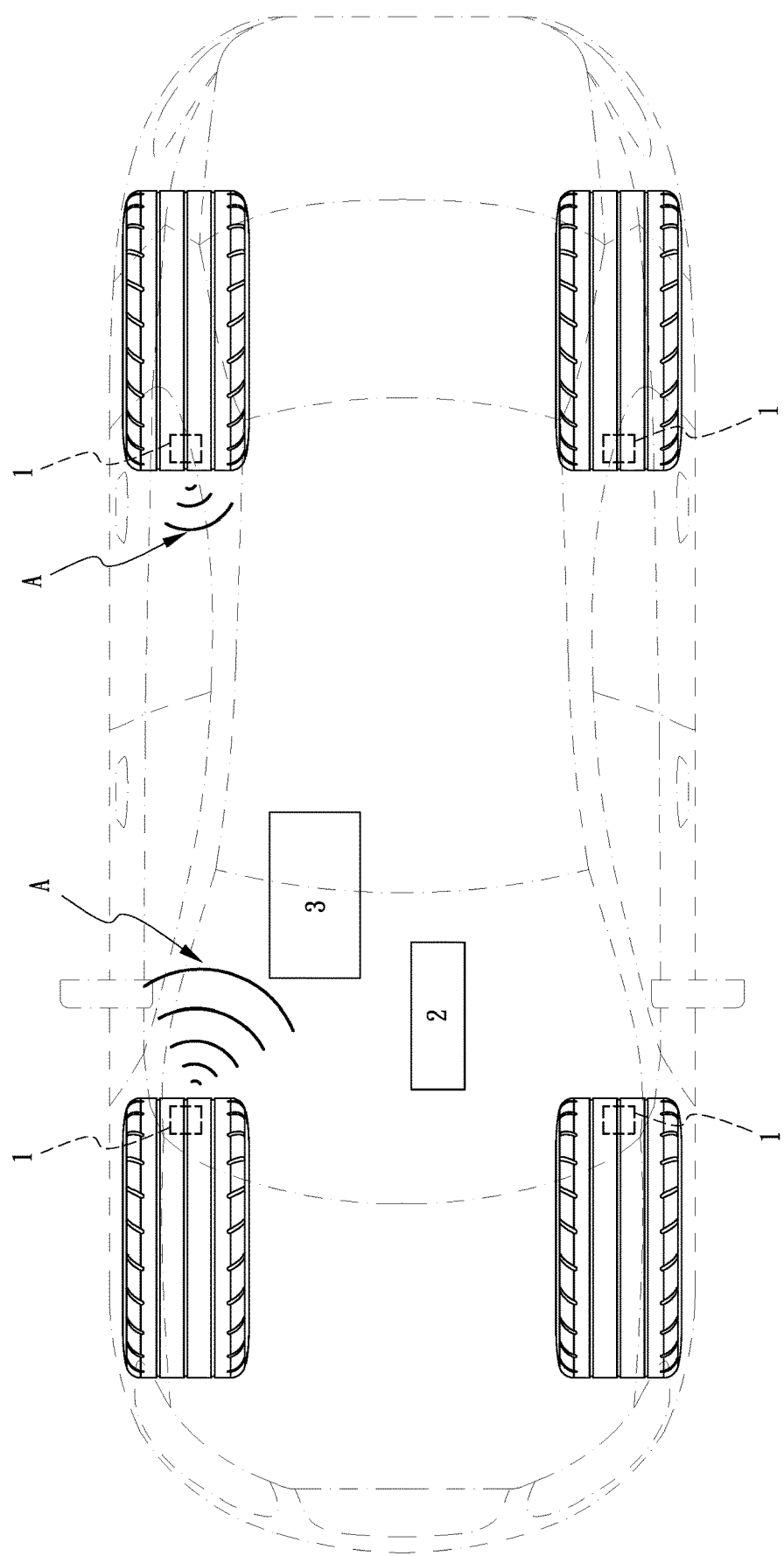
FIG. 3 illustrates the operation of the wireless tire pressure monitoring system of the present invention used to a vehicle.

As shown in FIGS. 1 to 3, when in use, the user connects the wireless receiver 3 to the wireless host 2 by the wireless system. Then the user proceeds a position setting to the wireless receiver 3. When each of the wireless tire pressure sensors 1 is connected to and sends signals to the wireless receiver 3 to the wireless host 2. The wireless host 2 and the wireless receiver 3 allocate the positions of the wheels where the wireless tire pressure sensors 1 are installed by the signal strength and the positions of the wireless receiver 3 to the wireless host 2. In the same time, the wireless receiver 3 sends the result of calculation and analysis forwards to the wireless host 2, so that the wireless host 2 cross-checks the info to position the wireless tire pressure sensors 1 precisely.

As shown in FIG. 3, the wireless receiver 3 is located close to the front right wheel, the wireless receiver 3 acknowledges that the strongest signal "A" is from the right front wheel, and the positions of the rest of the wheels can be judged by the strength of signals.

Figure 4:
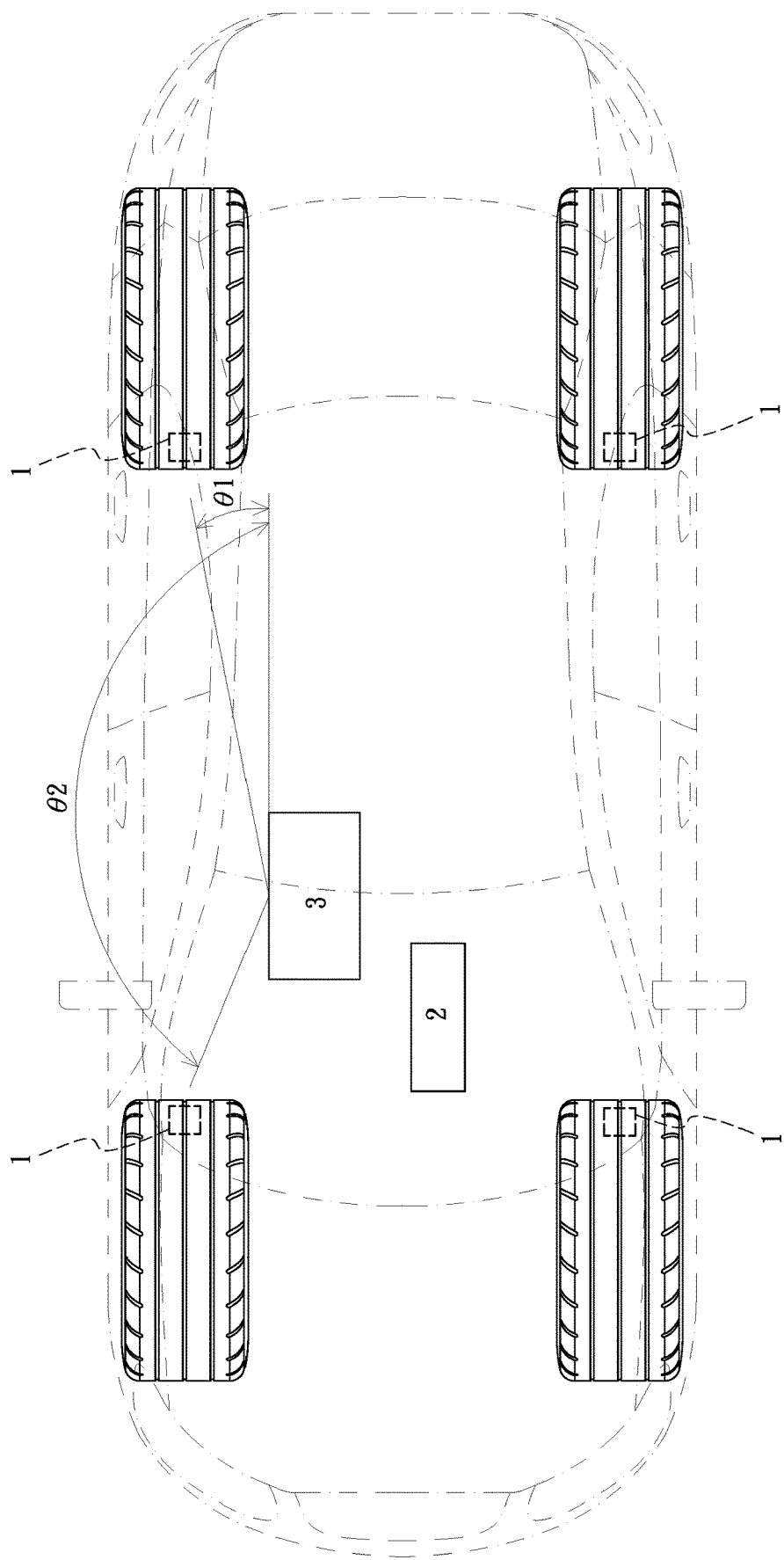
FIG. 4 illustrates another embodiment of the operation of the wireless tire pressure monitoring system of the present invention used to a vehicle.

As shown in FIG. 4, the second receiving/emitting module 32 is able to detect the phase angle "θ" of the signals that the emitting module 12 emits toward the second receiving/emitting module 32. The operation module 31 calculates the relative positions of each wireless tire pressure sensors 1 by the phase angle "θ", for example, the difference between the phase angle "θ1" and the phase angle "θ2" in FIG. 4. The operation module 31 compares the phase angle "θ1" and the phase angle "θ2", and the position of the operation module 31 to judge the position of each of the wireless tire pressure sensors 1.

Furthermore, the system of the present invention includes a monitor which displays the info that the control module 22 calculates, and assists the user to operate a positioning device of the wireless receiver 3.

As shown in FIG. 4, the wireless system is one of or more than one of a RFID, GRPS, Bluetooth, Wi-Fi, IrDA, UWB, Zigbee and NFC.

As shown in FIGS. 1 to 4, the method for allocating position of a wireless tire pressure sensor of the wireless tire pressure monitoring system comprises a connection step S10, a setting step S11, a transmission step S12, a calculating and forwarding step S13 and a completion step S14. The connection step S10 is to connect a wireless receiver 3 to a wireless host 2 by a wireless system. The wireless receiver 3 then searches and connects each wireless tire pressure sensor 1.

The setting step S11 is that a user operates the wireless receiver 3 to set a position of the wireless receiver 3 itself, and to assist allocation to each wireless tire pressure sensor 1.

The transmission step S12 is that each wireless tire pressure sensor 1 sends the tire pressure info to the wireless host 2 and the wireless receiver 3.

The calculating and forwarding step S13 is that the wireless host 2 and the wireless receiver 3 receive the tire pressure info from each wireless tire pressure sensor 1, and calculate the position of each wireless tire pressure sensor 1 by the tire pressure info that each wireless tire pressure sensor 1 sends. The wireless host 2 and the wireless receiver 3 allocate the position of each wireless tire pressure sensor 1 by one of or more than one of the signal strength and the phase angle of the tire pressure info. The wireless receiver 3 forwards the result of calculation made by the wireless receiver 3 to the wireless host 2.

The completion step is that the wireless host 2 cross-compares the result of calculation of the position of each wireless tire pressure sensor 1 made by the wireless host 2, and the result of calculation of the position of each wireless tire pressure sensor 1 made by the wireless receiver 3 to precisely allocate each wireless tire pressure sensor 1.

The method may include a confirming step S15 which confirms the result of the completion step S14. The wireless host 2 confirms a result of the confirming step S14 and further applications.

The wireless system mentioned in the method is one of or more than one of a RFID, GRPS, Bluetooth, Wi-Fi, IrDA, UWB, Zigbee and NFC.

The present invention further comprises the function of transferring tire info and verifies the tire info. The sensing module 11 of each wireless tire pressure sensor 1 detects the tire info, and the tire info is sent to the wireless host 2 and the wireless receiver 3 by the emitting module 12. The wireless receiver 3 then actively or passively sends the tire info to the wireless host 2. By the multiple verifications, the info that the wireless host 2 can be kept completely and does not loss.

While we have shown and described the embodiment in accordance with the present invention, it should be clear to those skilled in the art that further embodiments may be made without departing from the scope of the present invention.

What is claimed is:

1. A wireless tire pressure monitoring system comprising:
   a wireless tire pressure sensor for being installed to a wheel rim of a vehicle, the wireless tire pressure sensor including a sensor and an emitter;
   a wireless host for being installed to the vehicle, the wireless host including a circuit controller and a first receiving/emitting member, the circuit controller including a function of allocation by signals received, the first receiving/emitting member receiving signals from the wireless tire pressure sensor;
   a wireless receiver connected to the wireless host and the wireless tire pressure sensor by a wireless system, the wireless receiver located at a position different from a position of the wireless host, the wireless receiver including an operation module and a second receiving/emitting member, the second receiving/emitting member receiving and emitting signals, the second receiving/emitting member detecting a phase angle of the signals from the emitter and the second receiving/emitting member, the circuit controller calculating a position of the wireless tire pressure sensor by the phase angle;
   wherein the wireless tire pressure sensor sends signals to the first receiving/emitting member and the second receiving/emitting member by the emitter, the first receiving/emitting member and the second receiving/emitting member detect strength of the signals emitted from the wireless tire pressure sensor, the first receiving/emitting member and the second receiving/emitting member send the signals received from the wireless tire pressure sensor to the circuit controller and the operation member to be analyzed, the operation member forwards a result of the analyzed signals to the first receiving/emitting member and the circuit controller in sequence by the second receiving/emitting member.

2. The wireless tire pressure monitoring system as claimed in claim 1 further comprising a monitor which displays the phase angle that the circuit controller calculates, the monitor adapted to assist a user to operate a positioning device of the wireless receiver.

3. The wireless tire pressure monitoring system as claimed in claim 1, wherein the wireless system is one of or more than one of a RFID, GRPS, Bluetooth, Wi-Fi, IrDA, UWB, Zigbee and NFC.

4. A method for allocating position of a wireless tire pressure sensor of a wireless tire pressure monitoring system, comprising:
   a connection step: a wireless receiver connected to a wireless host by a wireless system, the wireless receiver then searching and connecting each wireless tire pressure sensor;
   a setting step: operating the wireless receiver to set a position of the wireless receiver, and to assist allocation to each wireless tire pressure sensor;
   a transmission step: each wireless tire pressure sensor sending a tire pressure info to the wireless host and the wireless receiver;
   a calculating and forwarding step: the wireless host and the wireless receiver receiving the tire pressure info from each wireless tire pressure sensor, and calculating a position of each wireless tire pressure sensor by the tire pressure info that each wireless tire pressure sensor sends, the wireless host and the wireless receiver allocating the position of each wireless tire pressure sensor by one of or more than one of a signal strength and a phase angle of the tire pressure info, the wireless receiver forwarding a result of calculation made by the wireless receiver to the wireless host, and
   a completion step: the wireless host cross-comparing a result of calculation of the position of each wireless tire pressure sensor made by the wireless host, and the result of calculation of the position of each wireless tire pressure sensor made by the wireless receiver to allocate each wireless tire pressure sensor.

5. The method as claimed in claim 4 further comprising a confirming step which confirms a result of the completion step, the wireless host confirms a result of the confirming step and further applications.

6. The method as claimed in claim 4, wherein the wireless system is one of or more than one of a RFID, GRPS, Bluetooth, Wi-Fi, IrDA, UWB, Zigbee and NFC.

* * * * *